R. J. SAPPER.
SALTING DEVICE.
APPLICATION FILED FEB. 17, 1921.
1,394,221.
Patented Oct. 18, 1921.
3 SHEETS—SHEET 1.
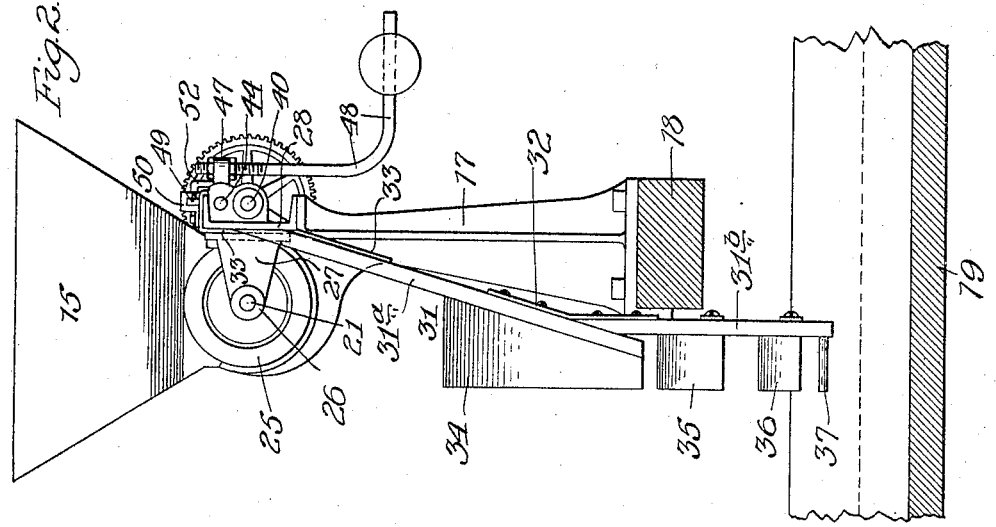
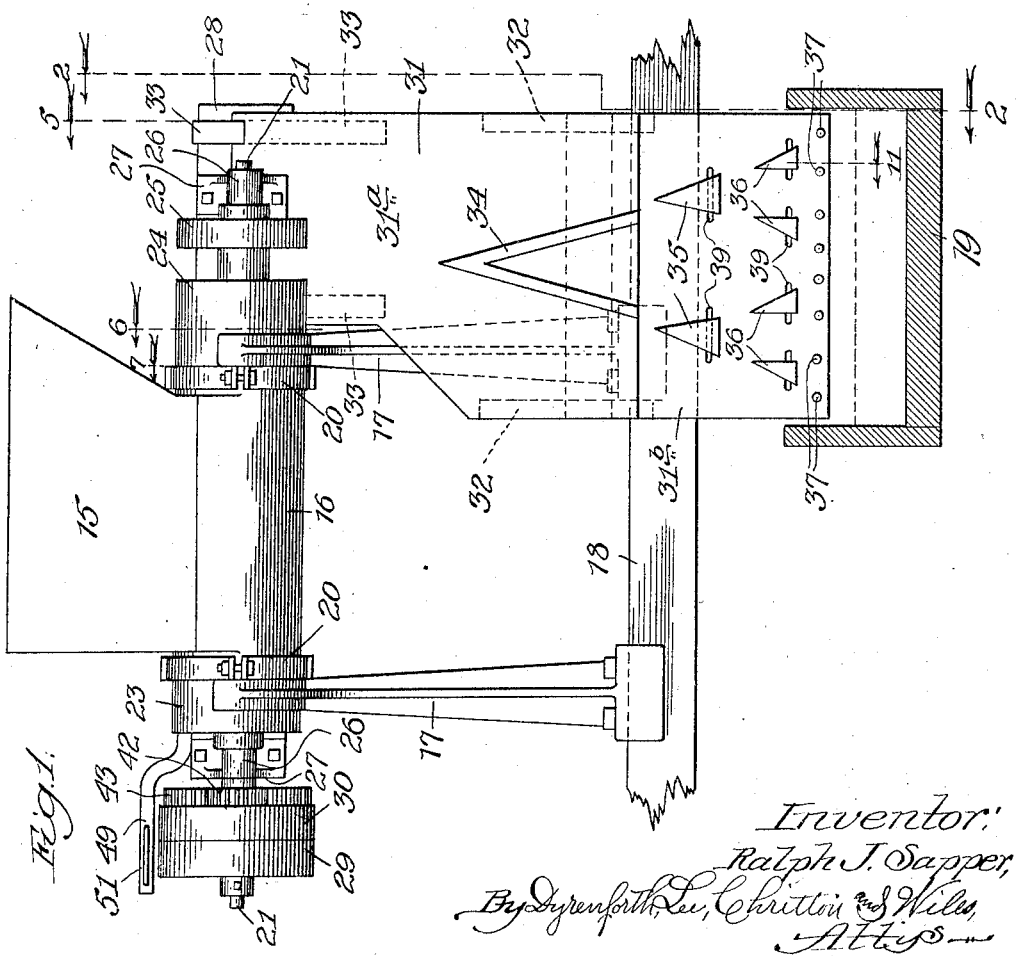
Inventor:
Ralph J. Sapper,
By Dyrenforth, Lee, Chritton and Wiles,
Attys

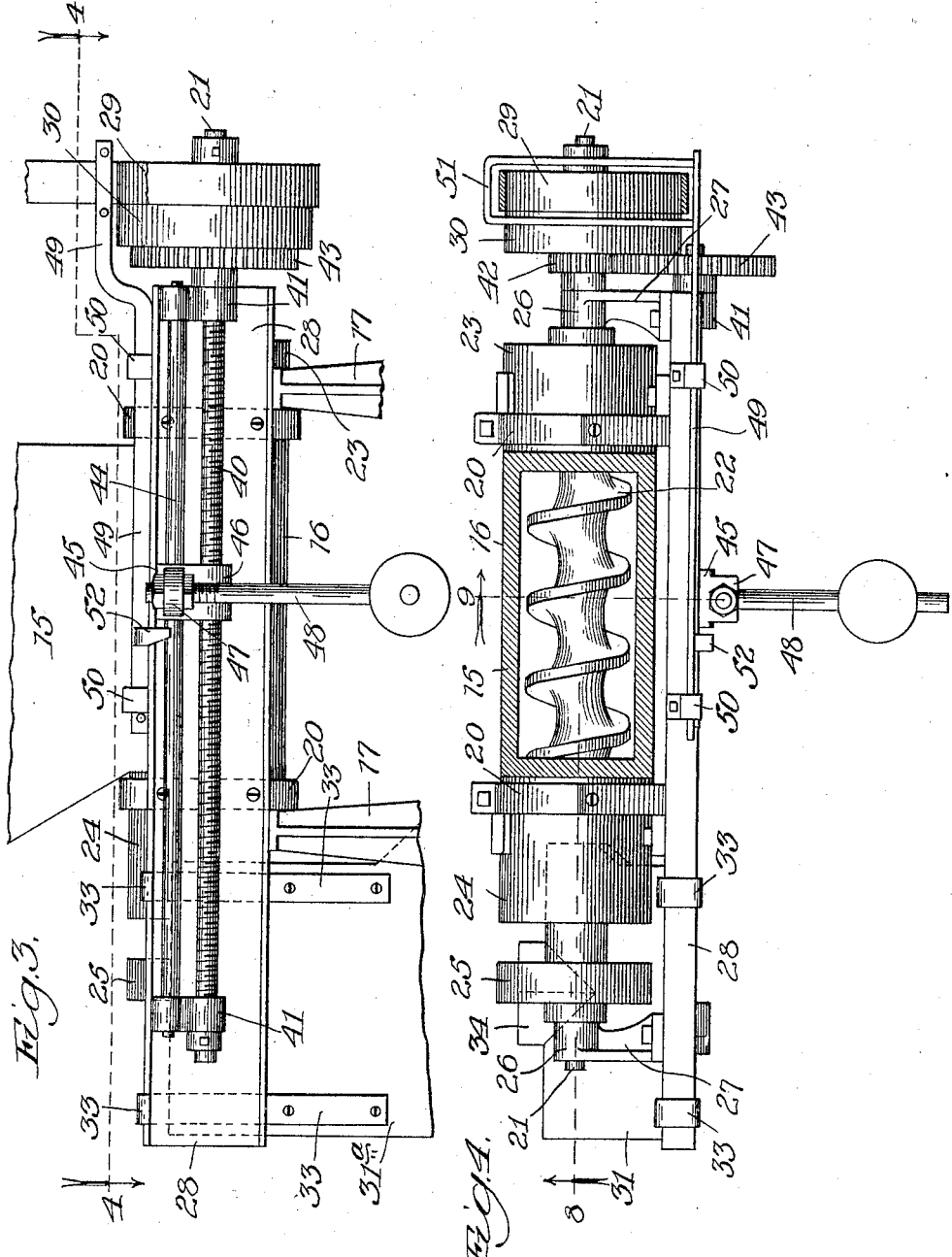

R. J. SAPPER.
SALTING DEVICE.
APPLICATION FILED FEB. 17, 1921.
1,394,221.
Patented Oct. 18, 1921.
3 SHEETS—SHEET 3.
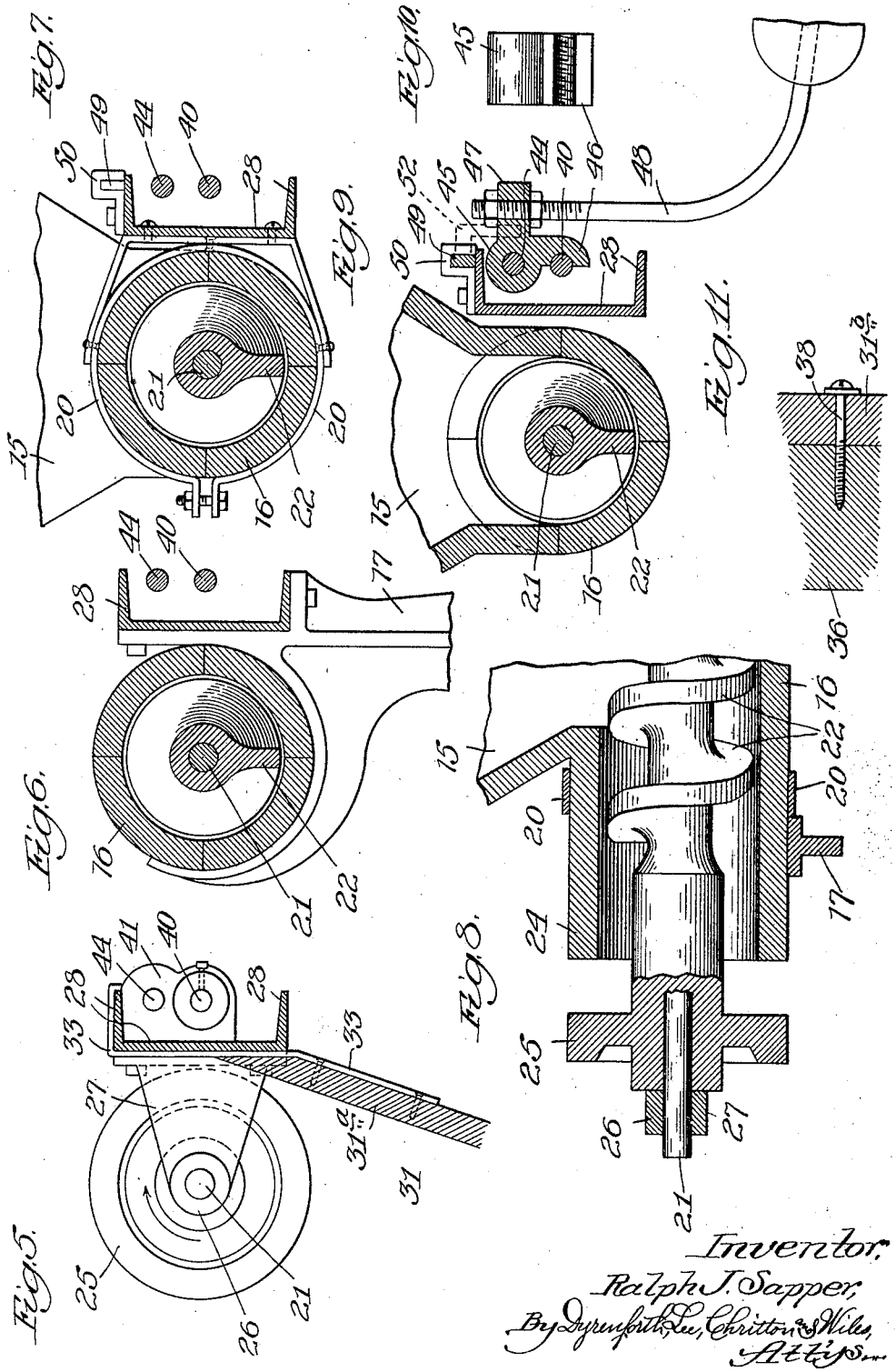
Inventor
Ralph J. Sapper,
By Dyrenforth, Lee, Chritton & Wiles
Attys

UNITED STATES PATENT OFFICE.

RALPH J. SAPPER, OF LOS ANGELES, CALIFORNIA, ASSIGNOR TO WILSON & COMPANY, OF CHICAGO, ILLINOIS, A CORPORATION OF NEW YORK.

SALTING DEVICE.

1,394,221.      Specification of Letters Patent.      Patented Oct. 18, 1921.

Application filed February 17, 1921. Serial No. 445,676.

*To all whom it may concern:*

Be it known that I, RALPH J. SAPPER, a citizen of the United States, residing at Los Angeles, in the county of Los Angeles and State of California, have invented a new and useful Improvement in Salting Devices, of which the following is a specification.

The present invention relates to salt distributing devices and more particularly to devices intended for salting butter, oleomargarin and the like during the working thereof. It will be fully understood from the following description, illustrated by the accompanying drawings, in which a device embodying the invention is shown.

In the drawings—

Figure 1 is a side elevation of the salt distributing device, showing it in position above a traveling table, of annular form, upon which the butter or oleomargarin is worked.

Fig. 2 is an end elevation of the salt distributing device, the working table being sectioned as shown by the line 2 of Fig. 1.

Fig. 3 is a side elevation of the device, parts of the hopper and distributing board being broken away, this elevation being taken from the side opposite that shown in Fig. 1.

Fig. 4 is a horizontal section on the line 4—4 of Fig. 3, showing the hopper in section and the remainder of the device in plan.

Fig. 5 is a detail sectional view on the line 5 of Fig. 1.

Fig. 6 is a detail vertical section on the line 6 of Fig. 1.

Fig. 7 is a detail vertical section on the line 7 of Fig. 1.

Fig. 8 is a detail vertical sectional view, partially broken away in longitudinal direction, on the line 8 of Fig. 4.

Fig. 9 is a detail vertical section in transverse direction on the line 9 of Fig. 4.

Fig. 10 is an elevation in detail of the sectional nut control member best shown in section in Fig. 9; and Fig. 11 is a section showing a detail of the distributing board on the line 11 of Fig. 1.

Referring more particularly to the drawings, the numeral 15 indicates a hopper fitting into a horizontal cylinder 16, which is supported upon standards 17 mounted upon a suitable supporting beam 18 which extends across and above the working table 19, which is in general traveling trough-like table of the form generally known in the art. The cylinder 16 may suitably be constructed of wood bound together by hoops or clamps 20. A shaft 21 extends centrally through the cylinder 16 and has rigidly secured to it a screw-conveyer 22 extending substantially the entire length of the cylinder, which is open at its discharge end 24. A disk 25 of substantially the same diameter as the cylinder is likewise supported upon the shaft 21 and is spaced a short distance from the discharge end 24 of said cylinder. The shaft 21 may suitably rotate in journals or bearings 26 in brackets 27 secured to a channel iron 28 extending longitudinally of the device and mounted upon the standards 17. Power may be supplied to the shaft 21 and screw 22 by any suitable means. In the device illustrated driving and belt pulleys 29 and 30 are shown mounted on the shaft 21.

A distributing device or board 31 is placed at the discharge end 24 of the cylinder to receive the discharged salt, and is provided with means for effecting the even distribution of the salt over the working table 19. This board may suitably be constructed of an upper inclined portion 31$^a$ and a lower vertical portion 31$^b$, the latter being suitably secured to the frame by the straps 32. The distributing board 31 may suitably be secured in its proper position by the straps 33 by which it is suspended from the channel iron 28, the lower portion 31$^b$ of the distributing board resting against the foot of the standard 17 mounted on the supporting beam 18. The distribution of the salt is effected by means of a plurality of upwardly tapering projecting members mounted upon the distributing board, each of which is so placed that its apex is in the path of a descending stream of salt and divides the latter into a plurality of streams. As illustrated in the drawings, the disk 25 mounted on the shaft 21 and spaced from the discharge end 24 of the cylinder 16 causes the salt discharged to fall in a vertical stream. This stream of salt falls upon the apex of the upwardly directed dihedral angle of a distributing member 34 which divides it into two substantially equal streams and diverts these laterally so that they fall upon the apices of the upwardly directed angles of the distributing members 35. Each of these divides the salt stream falling upon it into two substantially equal streams, which in turn fall upon the apices of the dihedral angles of the distributing members 36, each of which again divides the salt stream falling upon it into two substantially equal streams. The streams falling from the distributing members 36 in turn fall upon the distributing pins 37, each of which is disposed in such position as to receive a stream of salt falling from one side of the distributing members 36 and break it up before it falls upon the butter or oleomargarin on the table 19.

The several distributing members 35 and 36 are preferably made laterally adjustable. This adjustability may suitably be secured by mounting the said distributing members upon screws 38 which pass through horizontal slots 39 in the distributing board member 31b. Each of the distributing members 35 and 36 may thus be readily adjusted in position so as to properly divide the stream of salt falling upon it.

The distributing members 34, 35 and 36 are preferably made in the form of triangles. The magnitude and position of the apical angle of the distributing member is determined by the degree of separation desired for the streams of salt and by the position of the distributing member with reference to the stream of salt falling upon it. The apex of the uppermost distributing member 34, which receives a vertical falling stream of salt, diverges equally on each side from the vertical. The next lower distributing members 35, which receive the streams of salt falling at an angle from the vertical, have their inner sides more nearly approaching the vertical than their other sides. The next lower set of distributing members 36 have, in the specific device illustrated, one side substantially vertical. The angular magnitudes of the several distributing members are such that the streams of salt distributed from the lowermost set 36 fall substantially equally upon the spaced pins 37.

Suitable means are provided for controlling the movement of salt fed to the distributing mechanism. This may be accomplished, for example, as shown in the drawings, by means of an adjustable device limiting the period of operation of the screw 22. In the device illustrated, a worm-shaft 40, journaled in suitable brackets 41, secured to the channel-iron 28, is driven from shaft 21 by means of gears 42 and 43. A cylindrical rod 44 is mounted in the apex 41 above and parallel to the worm-shaft 40. On this rod 44 is slidably mounted a slide-member 45 having a downwardly depending lug 46 fitted with female threads and forming a sectional nut for engaging the worm-shaft 40. The slide 44 is likewise provided with a horizontally projecting lug 47 to which is secured a weighted member 48. Above the rod 44 a slidable rod 49 is suitably mounted in the slotted members 50 which are likewise secured to the channel-iron 28. This slidable rod 49 extends laterally to and over the belt pulleys 29 and 30 and is provided with a belt-shifting loop 51. At a suitable point for engagement by the slide 45 the rod 49 is provided with a downwardly projecting lug or stop 52. It is readily apparent that the length of time the screw 22 is permitted to operate may be determined by the position in which the slide 45 is set at the beginning of operations. Adjustment of the slide 45 may readily be effected by pivoting the slide on the rod 44, thereby raising the lug 46 out of engagement with the worm-shaft 40, sliding the slide-member 45 back along the shaft for a distance determined to give the desired length of feed of salt, and then replacing the lug 46 in engagement with the worm-shaft 40. At the end of the predetermined movement of the slide 45 it will engage the stop 52 and by its further movement will shift the belt from the driving pulley 29 to the idling pulley 30.

Although the present invention has been described in connection with the specific details of a device embodying it, it is not intended that these details shall be regarded as limitations upon the scope of the invention, except in so far as included in the accompanying claims.

I claim:

1. In a salt distributing device, in combination, means for delivering a substantially vertical stream of salt, a distributing board, and upwardly tapering distributing members mounted on said board, each being adapted to receive a stream of salt upon its apex and deliver divided streams of salt.

2. In a salt distributing device, in combination, means for delivering a vertical stream of salt, a distributing board, and upwardly tapering distributing members mounted on said board, each being adapted to receive a stream of salt upon its apex and deliver divided streams of salt, the apical angles of said members being so disposed as to substantially equally divide the streams of salt falling thereupon.

3. In a salt distributing device, in combination, a screw conveyer for delivering the salt, a disk spaced from the discharge end thereof to direct the issuing stream of salt substantially vertical, and means for distributing the discharged salt substantially evenly in a vertical plane.

4. In a salt distributing device, in combination, a screw conveyer for delivering the salt, means for terminating the operation of said screw conveyer after delivery of a predetermined quantity of salt, a disk spaced from the discharge end of said conveyer to direct the issuing stream of salt substantially vertical, and means for distributing the discharged salt substantially evenly in a vertical plane.

5. A device for substantially evenly distributing a substantially vertical descending stream of salt in a vertical plane, comprising a substantially vertical distributing board, triangular distributing members mounted upon said board, their apices being directed upwardly and each of said triangular members being arranged to receive a stream of salt upon its apex and deliver dividing streams of salt to the distributing members below it.

6. A device for substantially evenly distributing a substantially vertical descending stream of salt in a vertical plane, comprising a substantially vertical distributing board, triangular distributing members mounted upon said board, their apices being directed upwardly and each of said triangular members being arranged to receive a stream of salt upon its apex and deliver divided streams of salt to the distributing members below it, and distributing pins arranged below the lowermost triangular distributing members and adapted to receive and subdivide the divided streams of salt falling therefrom.

7. A device for substantially evenly distributing a substantially vertical descending stream of salt in a vertical plane, comprising a substantially vertical distributing board, a triangular member mounted on said board and having its apex directed upwardly to receive the descending stream of salt and divide it equally, and rows of laterally adjustable triangular distributing members secured to said board below the first-mentioned triangular member, each being adapted to receive and subdivide a divided stream of salt from the distributing member above it.

8. A device for substantially evenly distributing a substantially vertical descending stream of salt in a vertical plane, comprising a substantially vertical distributing board, a trangular member mounted on said board and having its apex directed upwardly to receive the descending stream of salt and divide it equally, rows of laterally adjustable triangular distributing members secured to said board below the first-mentioned triangular member, each being adapted to receive and subdivide a divided stream of salt from the distributing member above it, and pins to receive and break up the streams of salt falling from the lowermost row of distributing members.

RALPH J. SAPPER.